US008755177B2

(12) United States Patent
Farquhar et al.

(10) Patent No.: US 8,755,177 B2
(45) Date of Patent: Jun. 17, 2014

(54) METHOD AND APPARATUS FOR CONTROLLING THE TEMPERATURE OF A DISK DRIVE DURING MANUFACTURE

(75) Inventors: David Ronald Bain Farquhar, Chichester (GB); Matthew Roy Hill, Southampton (GB); Alexander Stephen Kay, Portsmouth (GB); David John Orriss, Southampton (GB)

(73) Assignee: Xyratex Technology Limited, Havant (GB)

( * ) Notice: Subject to any disclaimer, the term of this patent is extended or adjusted under 35 U.S.C. 154(b) by 603 days.

(21) Appl. No.: 12/065,587

(22) PCT Filed: Sep. 13, 2006

(86) PCT No.: PCT/GB2006/003369
§ 371 (c)(1),
(2), (4) Date: Mar. 3, 2008

(87) PCT Pub. No.: WO2007/031729
PCT Pub. Date: Mar. 22, 2007

(65) Prior Publication Data
US 2008/0239564 A1 Oct. 2, 2008

Related U.S. Application Data

(60) Provisional application No. 60/717,265, filed on Sep. 16, 2005.

(51) Int. Cl.
*H05K 7/20* (2006.01)
(52) U.S. Cl.
USPC .......................... 361/679.33; 454/184; 432/1
(58) Field of Classification Search
USPC .................. 360/97.02; 432/245, 1; 392/416; 438/22, 48; 454/184; 361/679.47, 361/679.33–679.41, 679.48, 679.52, 361/679.53, 688–690, 694–703; 324/158.1; 415/119; 165/80.3, 80.4, 104.33, 15.2
See application file for complete search history.

(56) References Cited

U.S. PATENT DOCUMENTS 4,767,262 A * 8/1988 Simon ........................... 415/119
5,079,438 A * 1/1992 Heung .......................... 307/141
(Continued)

FOREIGN PATENT DOCUMENTS

WO        01/41148        6/2001
WO      WO 01/41148     6/2001
(Continued)

OTHER PUBLICATIONS

International Search Report issued in PCT/GB2006/003369; Feb. 15, 2007, 2 pages.
(Continued)

*Primary Examiner* — Kang Hu
*Assistant Examiner* — John Bargero
(74) *Attorney, Agent, or Firm* — Pillsbury Winthrop Shaw Pittman LLP

(57) ABSTRACT

An apparatus for controlling the temperature of a disk drive during manufacture of the disk drive has a cell having a mounting arrangement to which a disk drive can be mounted and having walls defining a volume in which the disk drive is received when mounted to the mounting arrangement during manufacture of the disk drive. At least one wall of the cell adjacent said volume is heat conductive and is arranged such that a disk drive when received in the volume does not touch said at least one wall. An air-agitating device agitates air between the at least one wall and a disk drive when received in the volume to encourage heat transfer between said at least one wall and a disk drive when inserted into the volume. The air-agitating device is mounted so as to be vibrationally isolated from a said disk drive when mounted in the cell.

25 Claims, 10 Drawing Sheets

(56) References Cited

U.S. PATENT DOCUMENTS

| | | | |
|---|---|---|---|
| 5,263,537 A | 11/1993 | Plucinski | |
| 5,414,591 A * | 5/1995 | Kimura et al. | 361/695 |
| 5,724,818 A | 3/1998 | Iwata | |
| 5,870,247 A | 2/1999 | Schirle | |
| 5,886,639 A * | 3/1999 | Behl et al. | 340/635 |
| 5,927,386 A * | 7/1999 | Lin | 165/80.3 |
| 6,169,413 B1 * | 1/2001 | Paek et al. | 324/750.07 |
| 6,185,097 B1 * | 2/2001 | Behl | 361/695 |
| 6,188,571 B1 * | 2/2001 | Roganti et al. | 361/679.33 |
| 6,231,145 B1 * | 5/2001 | Liu | 312/332.1 |
| 6,252,769 B1 * | 6/2001 | Tullstedt et al. | 361/694 |
| 6,289,678 B1 * | 9/2001 | Pandolfi | 62/3.2 |
| 6,373,696 B1 * | 4/2002 | Bolognia et al. | 361/679.47 |
| 6,377,455 B1 * | 4/2002 | Nelik | 361/679.46 |
| 6,434,000 B1 | 8/2002 | Pandolfi | |
| 6,452,797 B1 * | 9/2002 | Konstad | 361/695 |
| 6,473,297 B1 * | 10/2002 | Behl et al. | 361/679.48 |
| 6,525,769 B1 | 2/2003 | Thomas | |
| 6,628,518 B2 * | 9/2003 | Behl et al. | 361/679.47 |
| 6,826,046 B1 * | 11/2004 | Muncaster et al. | 361/679.33 |
| 6,982,872 B2 * | 1/2006 | Behl et al. | 361/679.31 |
| 7,068,506 B2 * | 6/2006 | Behl | 361/695 |
| 7,255,529 B2 * | 8/2007 | Ku et al. | 415/119 |
| 7,283,364 B2 * | 10/2007 | Refai-Ahmed et al. | 361/719 |
| 7,405,932 B2 * | 7/2008 | Vinson et al. | 361/695 |
| 7,729,107 B2 * | 6/2010 | Atkins et al. | 361/679.02 |
| 2002/0141153 A1 * | 10/2002 | Su | 361/687 |
| 2003/0121337 A1 * | 7/2003 | Wanek et al. | 73/865.6 |
| 2003/0142439 A1 | 7/2003 | Hidaka | |
| 2004/0264121 A1 | 12/2004 | Orriss | |
| 2005/0007691 A1 | 1/2005 | Orriss | |
| 2005/0018397 A1 | 1/2005 | Kay | |
| 2005/0057849 A1 | 3/2005 | Twogood | |
| 2005/0116702 A1 * | 6/2005 | Wanek et al. | 324/158.1 |
| 2006/0012955 A1 * | 1/2006 | Vinson et al. | 361/695 |
| 2006/0215357 A1 * | 9/2006 | Green et al. | 361/678 |

FOREIGN PATENT DOCUMENTS

| | | |
|---|---|---|
| WO | 02/063628 | 8/2002 |
| WO | 2004/006260 | 1/2004 |
| WO | 2005/024830 | 3/2005 |
| WO | WO 2005/024831 | 3/2005 |
| WO | 2006/048611 | 5/2006 |
| WO | WO 2006/048611 | 5/2006 |
| WO | 2006/100445 | 9/2006 |

OTHER PUBLICATIONS

Singapore Office Action dated Mar. 4, 2009 for Appln. No. 200718961-6.

Examination Report dated Mar. 28, 2011 in corresponding European Patent Application No. 06 779 385.1.

* cited by examiner

METHOD AND APPARATUS FOR CONTROLLING THE TEMPERATURE OF A DISK DRIVE DURING MANUFACTURE

CROSS REFERENCE TO RELATED APPLICATIONS

This is the U.S. National Phase of PCT/GB2006/003369, filed Sep. 13, 2006, which in turn claims priority to U.S. provisional application Ser. No. 60/717,265, filed Sep. 16, 2005, both of which are incorporated herein in their entirety by reference.

The present invention relates to a method and apparatus for controlling the temperature of a disk drive during manufacture of the disk drive.

During manufacture of a disk drive, it is necessary to test the disk drive to ensure that it meets the required specification. As part of the testing operation, it is necessary to control the temperature of the disk drive. The temperature of the disk drive is varied across a wide range during testing. Also during manufacture of a disk drive, it is necessary to write data to the disk, such data including servo bursts and the like. It is desirable to be able to control the temperature of the disk drive to be at a particular temperature during such disk-writing, for example because the bearings that carry the disk drive operate better at a particular temperature or because the fly height of the read/write head over the disk can be better controlled at a particular temperature. A particular requirement during testing in the manufacture of a disk drive is that nothing should touch the top surface of the disk drive casing as otherwise the dynamics of the operation of the spinning disk and the movement of the arm carrying the read/write head can be compromised.

In one of the applicant's own known testing/manufacturing apparatus, the temperature of plural disk drive units is controlled by using cooling or heating air which is common to all of the disk drive units. In the applicant's WO-A-01/41148 and U.S. Pat. No. 6,826,046, the entire contents of which are hereby incorporated by reference, there is disclosed a more sophisticated arrangement in which a box-like cell has a front portion in which a disk drive (optionally in its own handling tray or carrier) can be received, and a rear portion in which there is mounted a centrifugal fan. A heat exchanger is mounted externally of the cell. The fan blows air over the disk drive from where the air passes around one end and back under the disk drive. Baffles are movably arranged so as to direct air to the heat exchanger as required. The air may selectively be hotter or colder than the disk drive in order to heat and cool the disk drive over a wide temperature range. This particular product has been very successful and allows the temperature of the disk drive to be varied over a range of about 20° C. to 70° C. during testing.

There are however some limitations in the apparatus of WO-A-01/41148 and U.S. Pat. No. 6,826,046. Most significantly, there is an increasing demand to lower the temperature of the disk drive to below ambient, and even below 0° C., during the test procedure. This is because disk drives are increasingly being used at such low temperatures by end users. For example, many in-car satellite navigation systems and audio and similar entertainment systems use disk drives and vehicles are often left in cold or sub-zero temperatures. By way of another example, portable MP3 players and the like use disk drives and, again, such products may be left at cold or sub-zero temperatures (for example because they are left in a vehicle overnight). The arrangement disclosed in WO-A-01/41148 and U.S. Pat. No. 6,826,046 cannot readily be adapted to lower the temperature sufficiently. For example, one possible solution would be to use a fan that spins at a higher rate. However, this would increase the vibrations arising in the apparatus during testing of the disk drive, which is highly undesirable. Alternatively, it might be possible to lower the temperature of the cold water supply to the heat exchanger(s). However, this can easily result in the temperature of the water being below the dew point, which would therefore cause problems because of the formation of condensation within the cells and/or the heat exchanger and/or its cold water supply pipes.

U.S. Pat. No. 6,434,000 discloses an arrangement for housing a disk drive for "rugged" use. The disk drive in its casing is supported in a sealed "ruggedized housing" which in turn is mounted in an "environmental housing". This apparatus is therefore clearly not suitable for use in supporting a disk drive during manufacture of the disk drive as it is not possible to have the access to the disk drive that is necessary during manufacture. Moreover, the arrangement of U.S. Pat. No. 6,434,000 does not have any air-agitating device or the like.

US-A-2003/0142439 discloses a unit for supporting a disk drive for use in a car (automobile). Again, this simple unit is not suitable for use in supporting a disk drive during manufacture of the disk drive. Moreover, whilst a fan is provided, this does not cause air between the disk drive and a thermally conductive wall of the unit to be agitated and instead simply blows air over a heat conductive plate and a heat sink.

U.S. Pat. No. 6,289,678 discloses a similar arrangement to that of U.S. Pat. No. 6,434,000 for housing a disk drive for "rugged" use. The disk drive in its casing is supported in a sealed housing (referred to in this patent specification as an "environmental housing"). This apparatus is therefore again clearly not suitable for use in supporting a disk drive during manufacture of the disk drive as it is not possible to have the access to the disk drive that is necessary during manufacture. Moreover, in particular examples, a fan is provided to blow air over the disk drive but the fan is not vibrationally isolated from the disk drive or the environment housing in which the disk drive is supported. Whilst this may be acceptable in an end use application for the disk drive given that disk drives are fairly tolerant to some vibration in end use applications, this cannot be tolerated in a manufacturing environment during testing of the disk drive.

U.S. Pat. No. 6,525,769 discloses a device for increasing heat transfer from an object, such as a mobile (cell) phone. The device has a heat plate on which the object to be cooled is placed.

According to a first aspect of the present invention, there is provided apparatus for controlling the temperature of a disk drive during manufacture of the disk drive, the apparatus comprising: a cell having a mounting arrangement to which a disk drive can be mounted and having walls defining a volume in which the disk drive is received when mounted to the mounting arrangement during manufacture of the disk drive; at least one wall of the cell adjacent said volume being heat conductive and being arranged such that a disk drive when received in the volume does not touch said at least one wall; and, an air-agitating device arranged to agitate air between said at least one wall and a disk drive when received in the volume to encourage heat transfer between said at least one wall and a disk drive when inserted into the volume; the air-agitating device being mounted so as to be vibrationally isolated from a said disk drive when mounted in the cell.

In the apparatus of this aspect, the air-agitating device is not used to drive a flow of heating or cooling air across the disk drive, and is instead present merely to agitate the air between the disk drive and the heat conducting wall in order to encourage heat transfer between the wall and the disk drive.

The principle of operation is therefore very different from that of the apparatus of WO-A-01/41148 and U.S. Pat. No. 6,826, 046 in which a flowing mass of air is responsible for the heat transfer between the disk drive and the heat exchanger. In the apparatus of this aspect, the air-agitating device is substantially vibrationally isolated from the disk drive, which may be achieved by vibrationally isolating the air-agitating device from the cell, minimising the effect on the disk drive of any vibration of the air-agitating device during operation. The air-agitating device may be mounted to the frame of a tester rack in which the cell is mounted in use, typically with very many other similar or identical cells. Contact between the heat conducting wall and the disk drive is avoided, which is an advantage as different disk drives from different manufacturers have different shapes and profiles and there is therefore no uniform surface or set of datum points on the different disk drives to which contact can be made in all cases.

Preferably, a heat exchanger is mounted within the cell. Whilst an advantage of this arrangement is that it minimises the space occupied by the apparatus, a key advantage is that the path length between the heat exchanger and the heat conductive wall is minimised, which reduces heat losses within the cell. It also allows the number of thermal interfaces or connections to be minimised, which increases efficiency. It also means that the thermal connection to the cell for carrying heat into and out of the cell may be the water hoses that supply the heat exchangers; such water hoses are typically flexible and thus this arrangement helps to vibrationally isolate the cell from the exterior (such as the rack in which the cell is typically mounted in use). In contrast, in cases where the heat exchanger is outside the cell, the thermal connection to the cell would have to be made by a heat pipe, which is a rigid tube and which can therefore transmit vibrations into and out of the cell, which is undesirable. Another advantage is that the empty space within the cell is minimised. This minimises the amount of moisture present within the cell, which is important at low temperatures to prevent or at least minimise the build-up of condensation within the cell during operation.

In an embodiment, the heat exchanger is directly thermally connected to said heat conductive wall. Indeed, the heat conductive wall may be a part of the heat exchanger.

In another embodiment, the heat exchanger is thermally connected to said heat conductive wall by a heat pump that is operable to pump heat between the heat exchanger and the heat conductive wall. The heat conductive wall may be a part of the heat pump.

The heat pump is a bi-directional device that can be used to pump heat towards or away from the disk drive as required.

In an embodiment, the heat exchanger is thermally connected to said heat conductive wall by a heat pipe. A heat pipe is a passive device which can be used to carry heat into or out of the disk drive as required. In an embodiment, the heat exchanger is thermally connected to the heat pipe by a heat pump that is operable to pump heat between the heat exchanger and the heat pipe.

In one preferred embodiment, the heat pump is a Peltier device.

The air-agitating device may be a fan. The fan may be for example an axial fan or a radial fan. Alternatively, another air-agitating device may be used, such as the oscillatory air movement generator (e.g. a voice-coil motor connected to a diaphragm, or a piezo-electric element or bellows) disclosed in our U.S. patent application No. 60/624173 entitled A TEMPERATURE CONTROL APPARATUS FOR A HARD DISK DRIVE AND A METHOD OF VARYING THE TEMPERATURE OF A HARD DISK DRIVE and filed on 3 Nov. 2004 and the corresponding PCT application WO-A-2006/048611, the entire contents of which are hereby incorporated by reference.

According to a second aspect of the present invention, there is provided a method of controlling the temperature of a disk drive during manufacture of the disk drive, the method comprising: mounting a disk drive to a mounting arrangement of a cell having walls that define a volume in which the disk drive is received when mounted to the mounting arrangement during manufacture of the disk drive, at least one wall of the cell adjacent said volume being heat conductive and being arranged such that the disk drive when received in the volume does not touch said at least one wall; and, operating an air-agitating device to agitate air between said at least one wall and a disk drive when received in the volume to encourage heat transfer between said at least one wall and a disk drive when inserted into the volume; the air-agitating device being vibrationally isolated from the disk drive.

The method preferably comprises operating a heat exchanger mounted within the cell.

The heat exchanger may be directly thermally connected to said heat conductive wall.

The heat exchanger may be thermally connected to said heat conductive wall by a heat pump, the method comprising operating the heat pump to pump heat between the heat exchanger and the heat conductive wall.

The heat exchanger may be thermally connected to said heat conductive wall by a heat pipe. The heat exchanger may be thermally connected to the heat pipe by a heat pump, the method comprising operating the heat pump to pump heat between the heat exchanger and the heat pipe. The heat pump may be a Peltier device.

The air-agitating device may be a fan.

According to a third aspect of the present invention, there is provided apparatus for controlling the temperature of a disk drive during manufacture of the disk drive, the apparatus comprising: a cell having a mounting arrangement to which a disk drive can be mounted and having walls defining a volume in which the disk drive is received when mounted to the mounting arrangement during manufacture of the disk drive; an upper wall of the cell adjacent said volume and a lower wall of the cell adjacent said volume both being heat conductive and being arranged such that a disk drive when received in the volume does not touch said upper and lower walls; and, an upper heat exchanger located above and in thermal contact with said upper wall and a lower heat exchanger located below and in thermal contact with said lower wall.

A particular advantage of this aspect of the invention arises when plural such apparatus are stacked one above the other in a test rack. In that case, the disk drives in the various apparatus are separated from each other by at least the respective upper and lower heat exchangers. This is significant because during testing, the disk drives are tested asynchronously and independently, which means that for example one disk drive in one cell may be at a low temperature (e.g. below 25° C.) whereas a disk drive in a cell above or below may be at a high temperature (e.g. above 50° C.). Having the heat exchangers between the cells provides for very effective heat insulation between the disk drives. Moreover, the temperatures of the heat exchangers of all of the apparatus will normally be at the same temperature (of e.g. 15° C.) and thus the upper and lower parts of the apparatus that are adjacent each other in the rack are at the same temperature. This further serves to thermally isolate the adjacent cells from each other by reducing thermal cross-talk between the adjacent cells.

The apparatus may comprise a first heat pump between the upper heat exchanger and said upper wall that is operable to pump heat between the upper heat exchanger and said upper wall, and a second heat pump between the lower heat exchanger and said lower wall that is operable to pump heat between the lower heat exchanger and said lower wall. The heat pumps may be Peltier devices.

The apparatus preferably comprises an air-agitating device arranged to agitate air between said upper and lower walls and a disk drive when received in the volume to encourage heat transfer between said upper and lower walls and a disk drive when inserted into the volume. The air-agitating device is preferably mounted so as to be vibrationally isolated from a said disk drive when mounted in the cell. The air-agitating device may be a fan.

According to a fourth aspect of the present invention, there is provided a method of controlling the temperature of a disk drive during manufacture of the disk drive, the method comprising: mounting a disk drive to a mounting arrangement of a cell having walls defining a volume in which the disk drive is received when mounted to the mounting arrangement during manufacture of the disk drive, an upper wall of the cell adjacent said volume and a lower wall of the cell adjacent said volume both being heat conductive and being arranged such that the disk drive when received in the volume does not touch said upper and lower walls; and, operating an upper heat exchanger located above and in thermal contact with said upper wall and a lower heat exchanger located below and in thermal contact with said lower wall to control the temperature of the disk drive.

The method preferably comprises operating a first heat pump between the upper heat exchanger and said upper wall to pump heat between the upper heat exchanger and said upper wall, and operating a second heat pump between the lower heat exchanger and said lower wall to pump heat between the lower heat exchanger and said lower wall. The heat pumps may be Peltier devices.

The method preferably comprises operating an air-agitating device to agitate air between said upper and lower walls and a disk drive when received in the volume to encourage heat transfer between said upper and lower walls and a disk drive when inserted into the volume. The air-agitating device is preferably vibrationally isolated from the disk drive. The air-agitating device may be a fan.

Embodiments of the present invention will now be described by way of example with reference to the accompanying drawings, in which.

Figure 1:
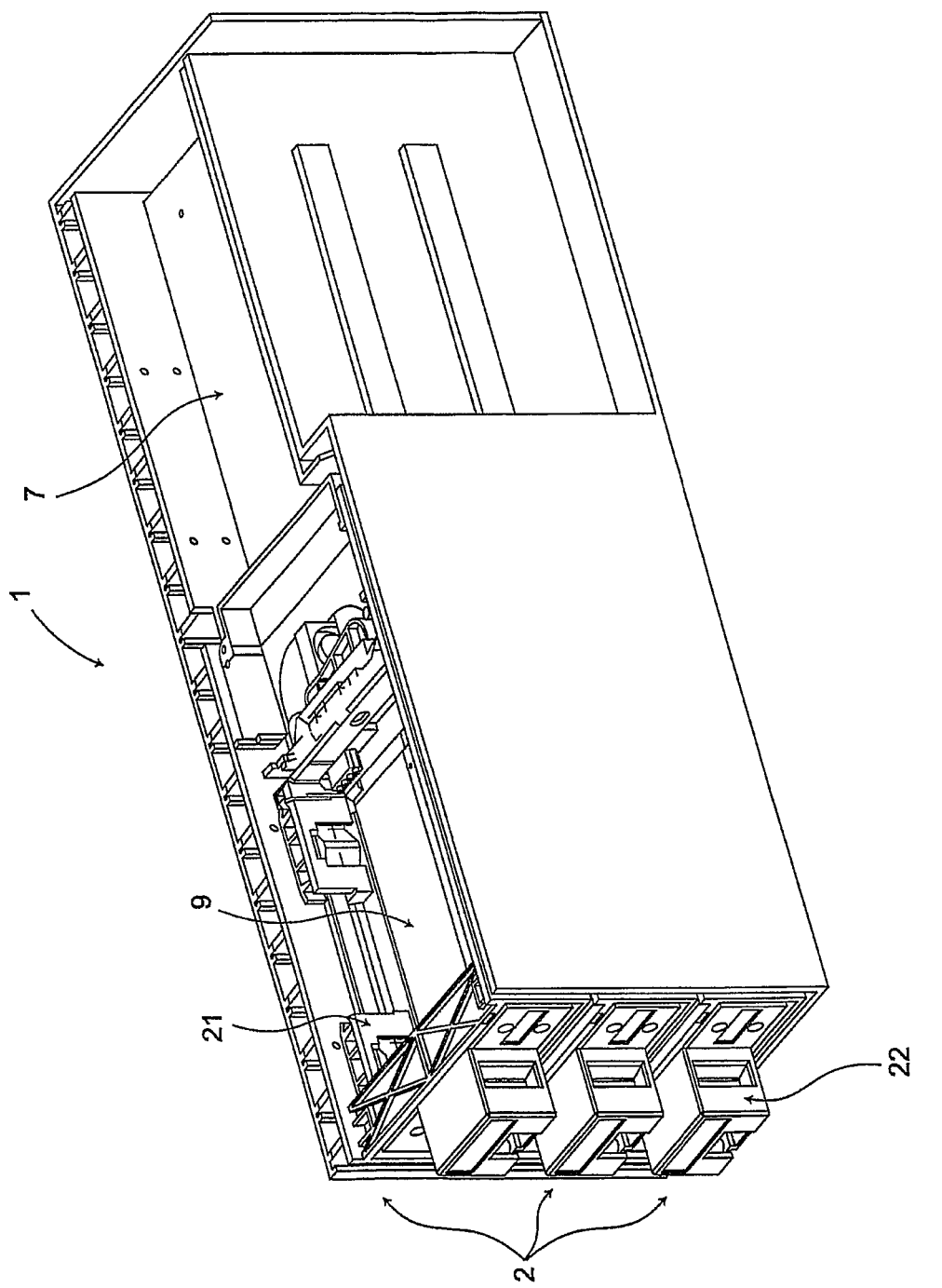
FIG. 1 is a sectioned perspective view through a first example of apparatus according to am embodiment of the present invention.
Figure 2:
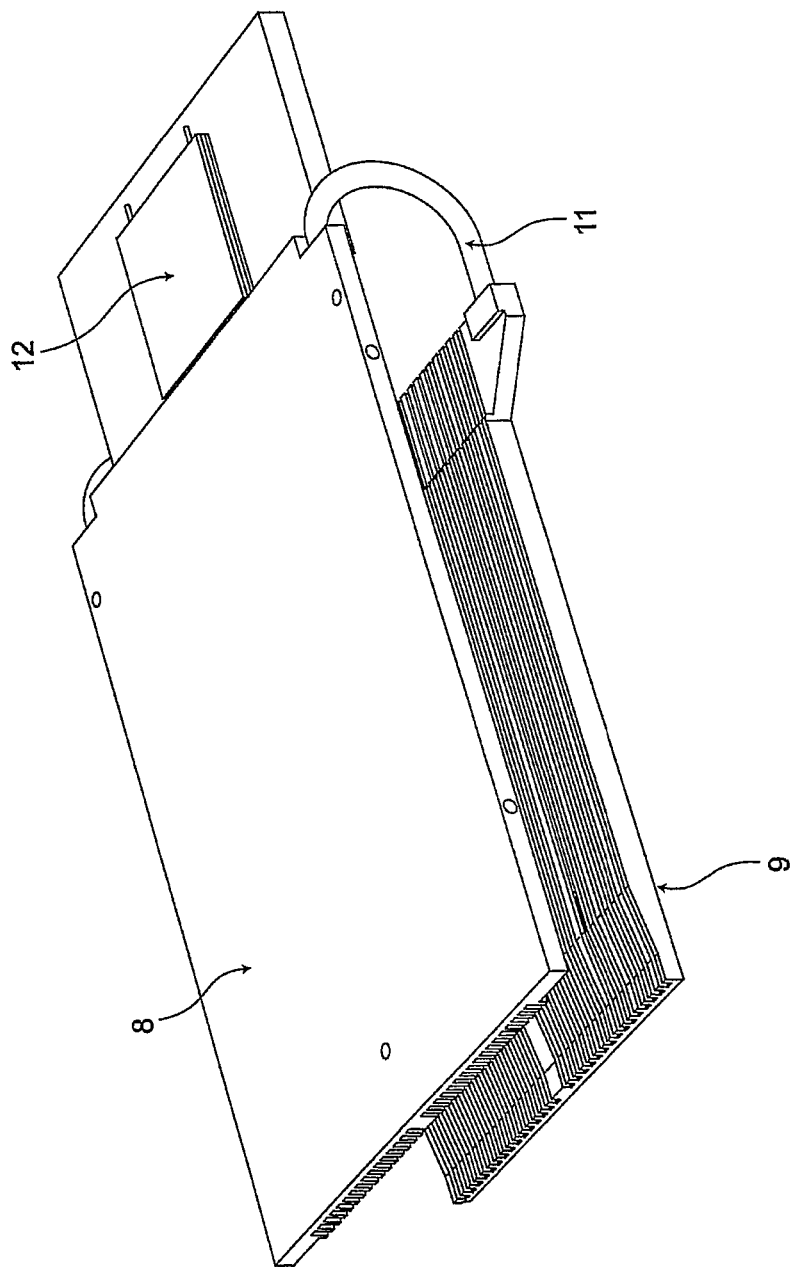
FIGS. 2 and 3 are perspective views showing components of the apparatus of FIG. 1.
Figure 3:
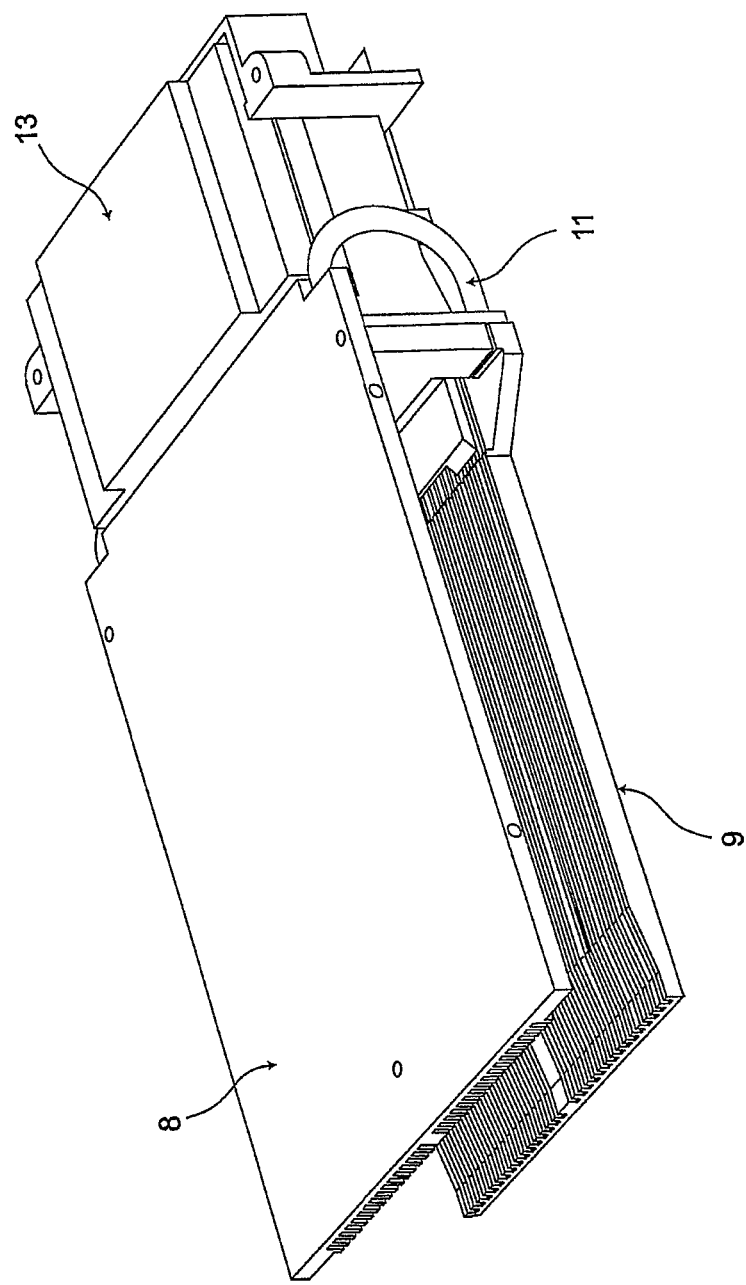

Referring to the first example of FIGS. 1 to 6, FIG. 1 shows a sectioned perspective view of apparatus 1 having plural cells 2 each for receiving a disk drive 20. In one embodiment, there are six cells 2 stacked vertically one above the other. In FIG. 1, two complete cells 2 are shown and the third cell 2 is sectioned.

Figure 4:
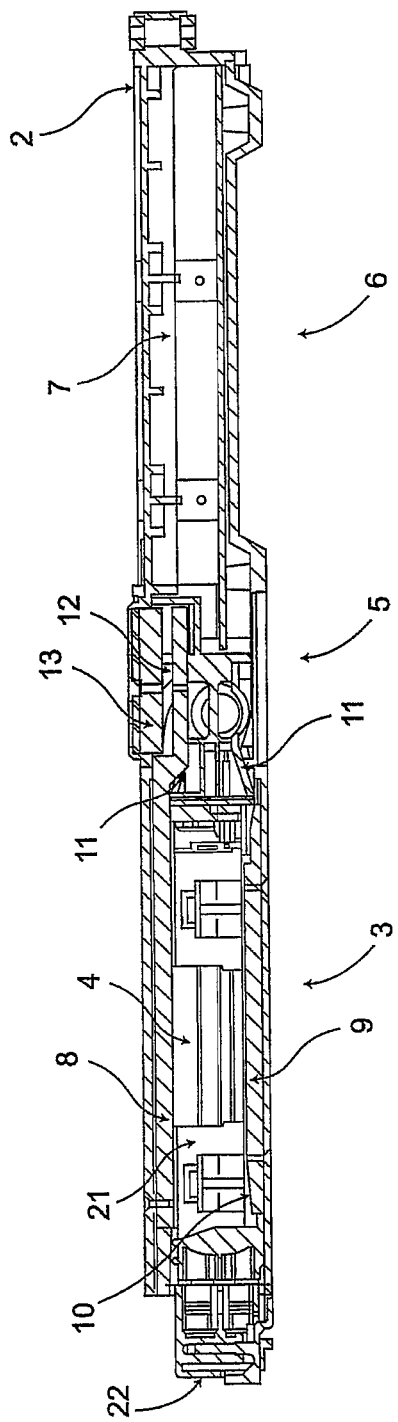
FIG. 4 is a longitudinal sectional view through a cell of the apparatus of FIG. 1.

Referring particularly to FIG. 4, which shows a longitudinal section through one of the cells 2, the cell 2 is of generally rectangular box-like construction. A front portion 3 of the cell 2 is open at the front to allow a disk drive 20 to be inserted into and removed from the cell 2 and has a volume 4 in which a disk drive 20 can be received. A middle portion 5 contains various heat control components as will be discussed further below. A rear portion 6 of the cell 2 contains test card electronics 7 which are known per se for testing the disk drive 20.

At the top and bottom of the volume 4 within the front portion 3 of the cell 2 are upper and lower heat spreader plates 8,9 which define the upper and lower boundaries of the volume 4. The heat spreader plates 8,9 are made of a thermally conductive material. A metal, such as a zinc alloy, may be used for this purpose. The front edge 10 of the lower heat spreader plate 9 is chamfered to improve the airflow around the disk drive 20 and to facilitate insertion of the disk drive 20 into the volume 4. The volume 4 is sufficiently tall so as to leave an air space between the top and bottom of the disk drive 20 and the upper and lower heat spreader plates 8,9 respectively.

One or more heat pipes 11 connect the heat spreader plates 8,9 to a heat pump 12 which is in thermal contact with a heat exchanger 13. The heat pump 12 and heat exchanger 13 are positioned in the central portion 5 of the cell 2. It is to be noted that the heat pump 12 and the heat exchanger 13 are therefore located within the footprint of the cell 2. One or more heat pipes (not shown) may also be connected directly between the upper and lower heat spreader plates 8,9 to ensure that they are at the same temperature. The heat pumps 12 may be of any suitable form, but Peltier devices are preferred owing to small size, their efficiency, their ability to pump heat effectively over a wide temperature range, and the fact that they are bi-directional and thus can be selectively operated to pump heat in either direction. The heat exchanger 13, heat pipes 11, and heat pumps 12 are preferably provided as a sealed subassembly so as to prevent or at least minimise moisture build-up around these components.

Figure 5:
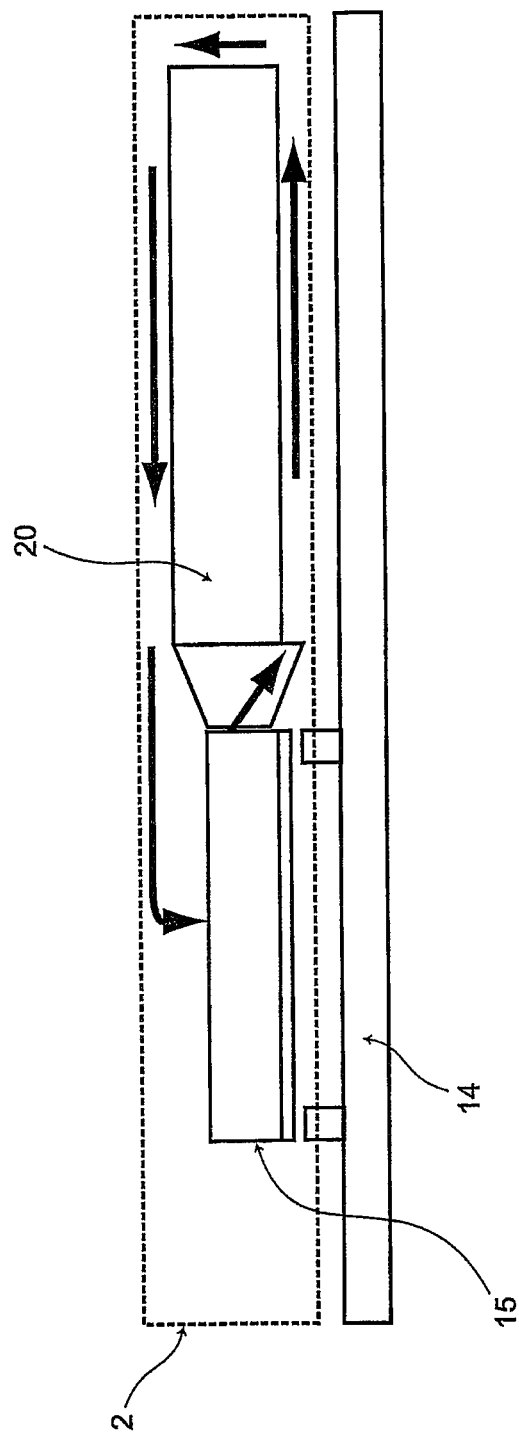
FIG. 5 is a schematic sectional view of the cell of FIG. 4 and a fan.
Figure 6:
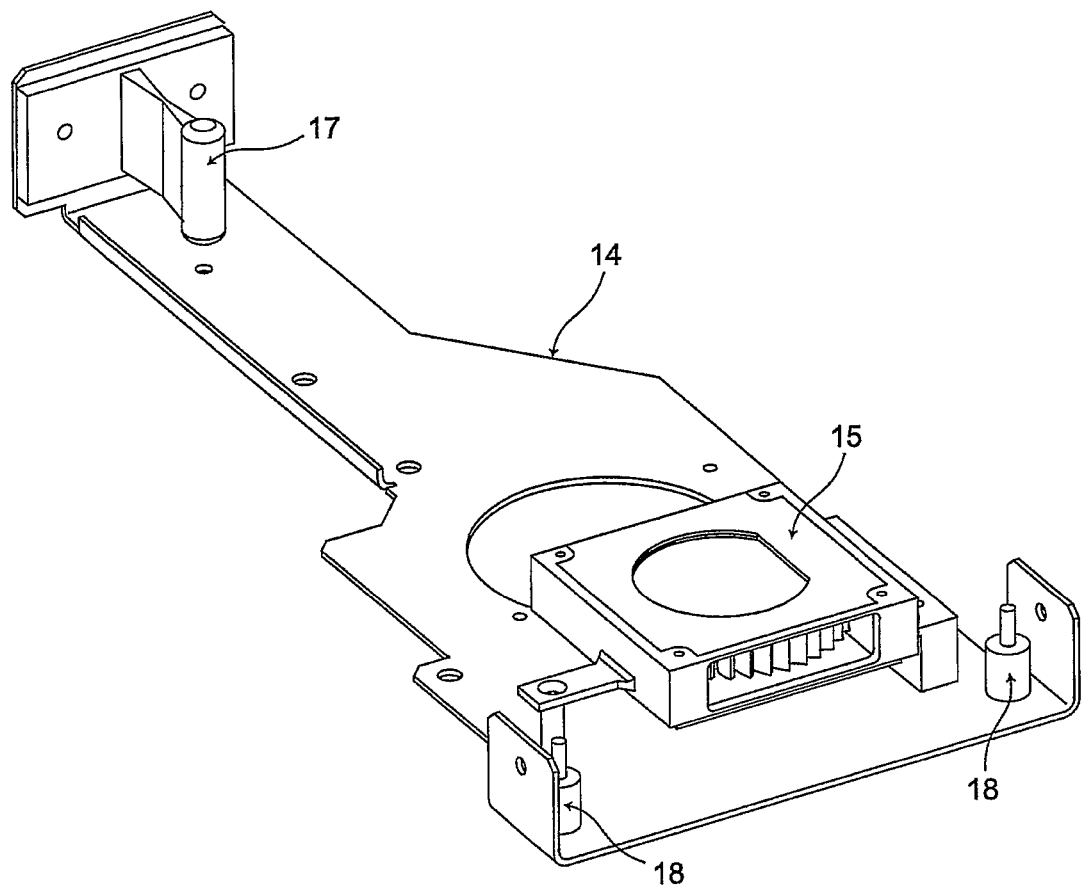
FIG. 6 shows a perspective view of the mounting arrangement for the fan for the cell of FIG. 4.
Figure 7:
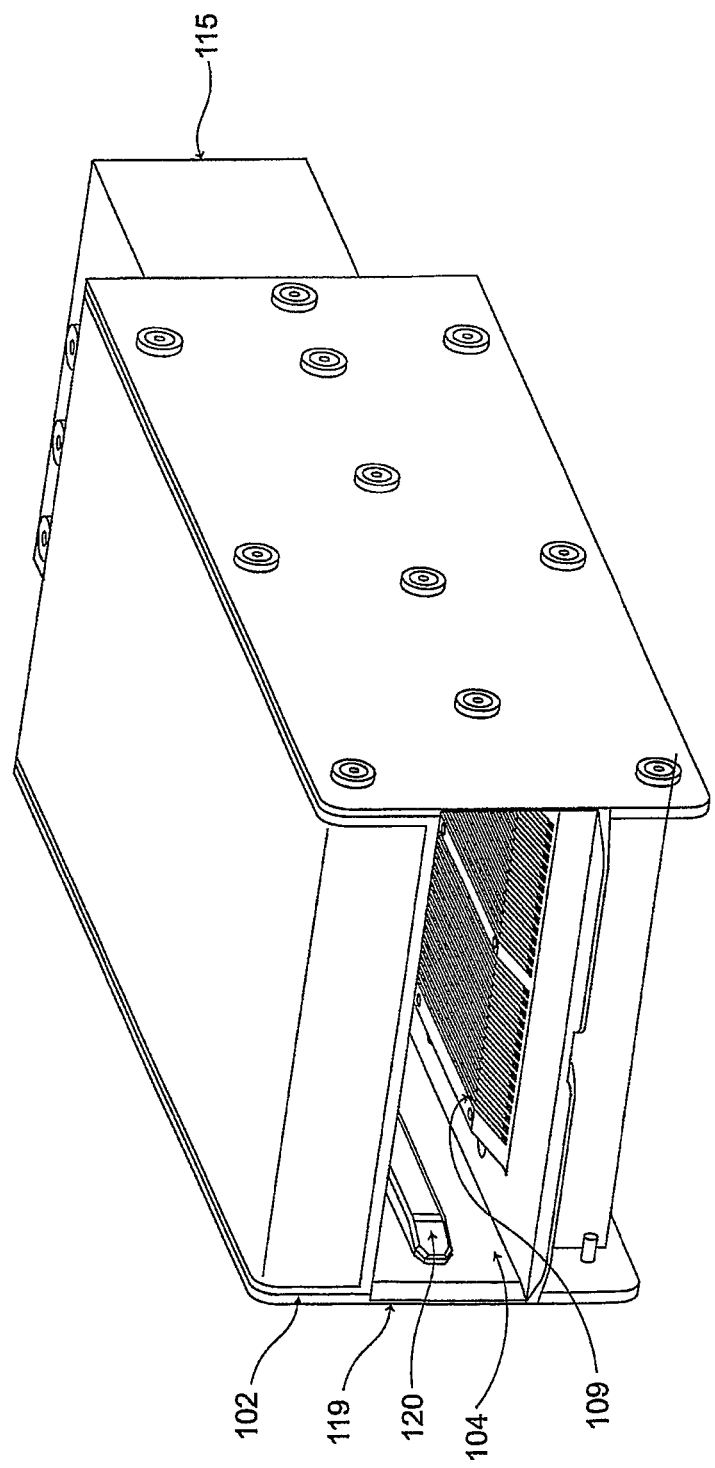
FIG. 7 is a perspective view of another example of apparatus according to an embodiment of the present invention.
Figure 8:
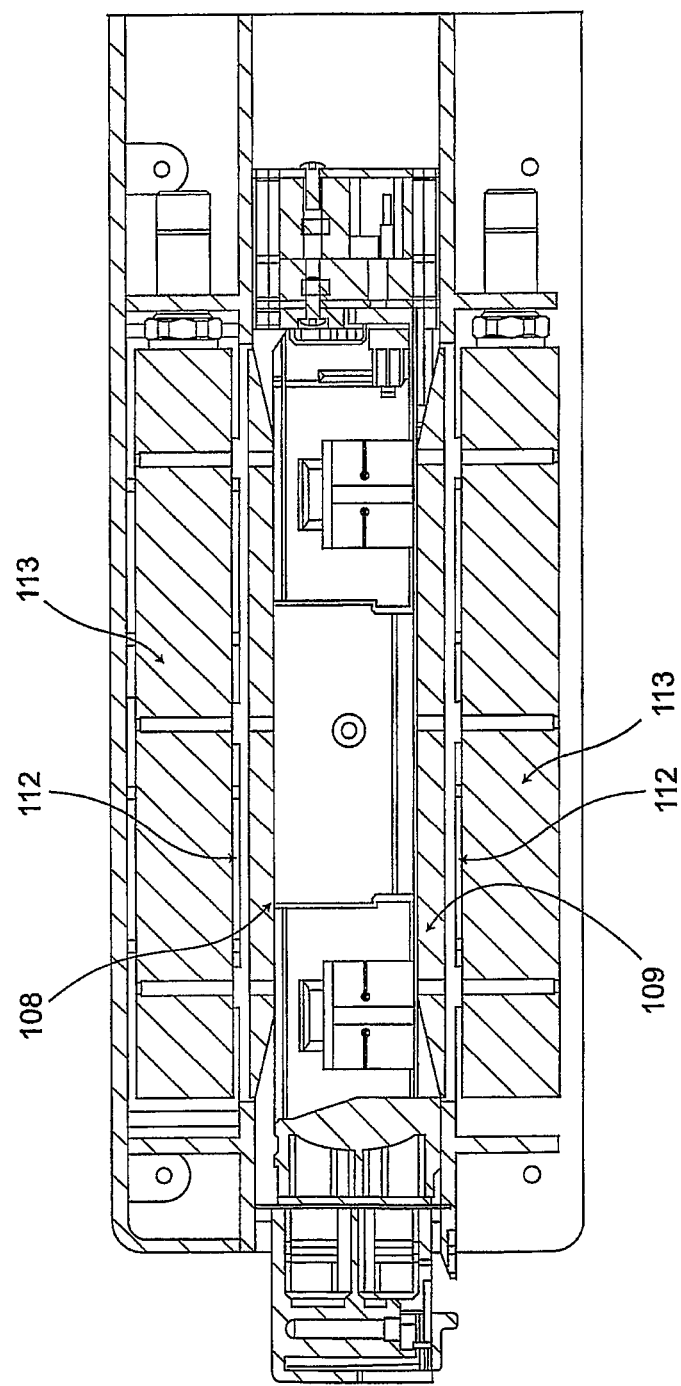
FIG. 8 is a longitudinal sectional view through the apparatus of FIG. 7.
Figure 9:
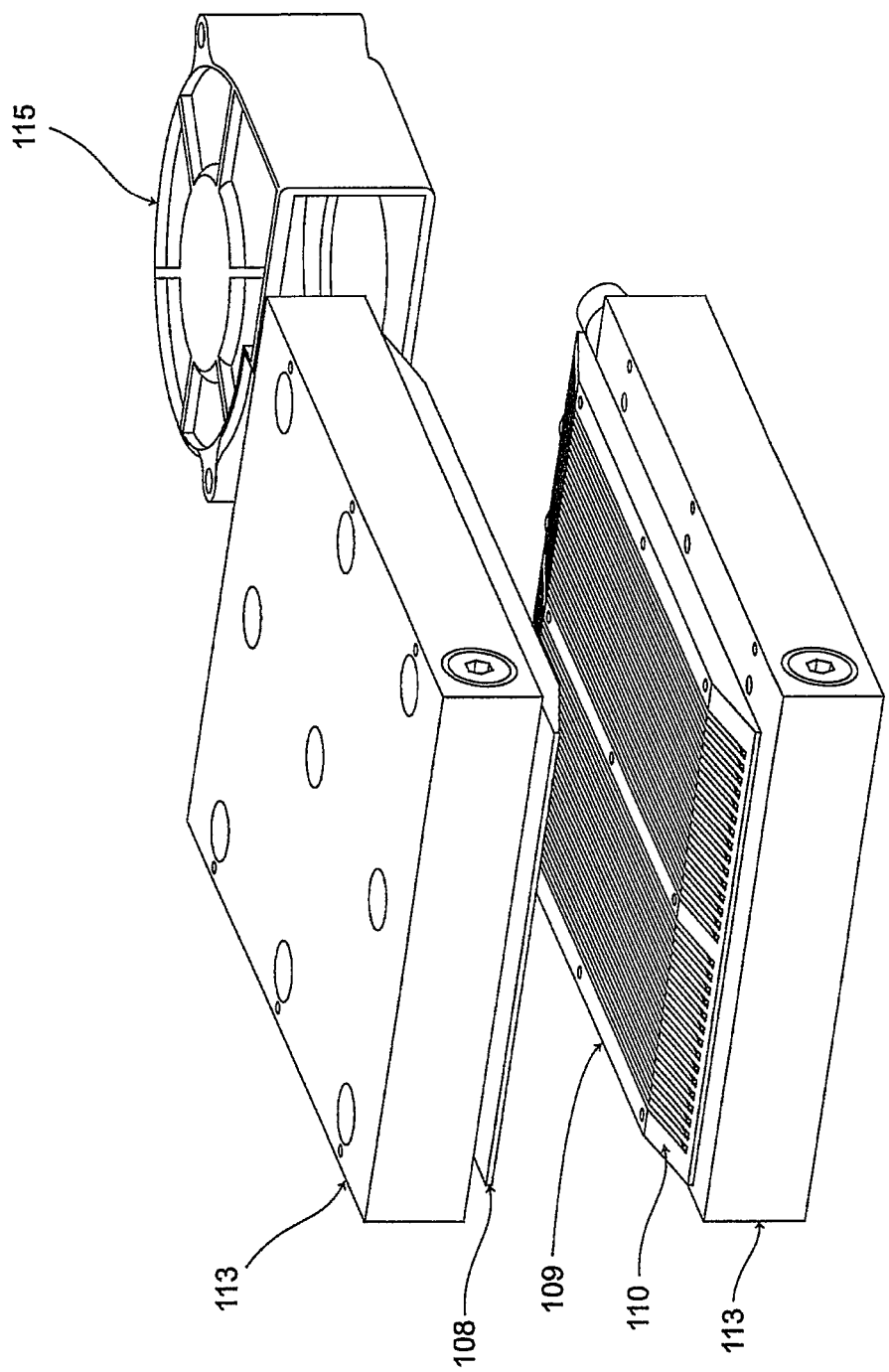
FIG. 9 shows a perspective view of components of the apparatus of FIG. 7.

Referring now to FIGS. 5 and 6, the rack-like apparatus 1 in which the cells 2 are mounted includes plural shelves 14, one for each cell 2 and positioned below the respective cell 2. An axial fan 15, i.e. a fan through which air flows parallel to the axis of rotation of the blades, is rigidly mounted to each shelf 14. The central portion 5 of the cell 2 has a corresponding void such that when the cell 2 is fixed in the apparatus 1, the fan 15 projects into the void of the central portion 5 of the cell 2. In this way, the fan 15 is not connected to the cell 2 and therefore any vibration of the fan 15 during operation does not cause any (significant) vibration of the disk drive 20 in the cell 2. The fan 15 is therefore in substance vibrationally isolated from the disk drive 20. Operation of the fan 15 in general does not produce a flow of mass of air. On the contrary, the main function of the fan 15 is to agitate air around the disk drive 20 within the volume 4 of the front portion 3 of the cell 2 so as to encourage heat transfer between the disk drive 20 and the heat spreader plates 8,9.

The cell 2 is mounted to the shelf 14 via a flexible pivot point 17 at one end of the shelf 14 which engages with a corresponding cut-out (not shown) on the cell 2, and via a pair of stud-mounted isolators 18 on the shelf 14 which engage in holes or recesses (not shown) in the underside of the cell 2. The arrangement is preferably like that disclosed and claimed in our co-pending U.S. patent application No. 60/664,170 filed 23 Mar. 2005 and entitled APPARATUS FOR SUP- PORTING A DISK DRIVE AND DISK DRIVE TEST APPARATUS and the corresponding PCT application no. PCT/GB2006/000970, the entire contents of which are hereby incorporated by reference. The arrangement disclosed in these earlier US and WO patent applications is such that the centre of rotation of the cell 2 is outside the portion in which the disk drive 20 is mounted, which minimises the errors that can otherwise arise when reading from and writing to the disk during the testing procedure.

The disk drive 20 may be mounted in the front portion 3 of the cell 2 in a manner generally known per se. For example, the disk drive 20 may be carried in a carrier or tray 21 having a front handle 22 which can be gripped by a robot to load the disk drive 20 and tray 21 into and unload the disk drive 20 and tray 21 from the cell 2 via the open front of the cell 2. Electrical connections and the like are provided at the rear of the volume 4 for connection to the disk drive 20. The tray 21 may be mounted in the cell 2 using the arrangement disclosed in our US patent application No. 60/6641,70 and PCT application no. PCT/GB2006/000970 referenced above. In general, the tray 21 may be of any known type, including those disclosed in our US-A-2004-0264121, US-A-2005-0007691, US-A-2005-0018397 and WO-A-2005/024830, the entire contents of which are hereby incorporated by reference. In the preferred embodiment shown, however, the tray 21 has no base or floor so that there is nothing between the lower heat spreader plate 9 and the disk drive 20 when loaded into the tray 21, which facilitates the transfer of heat by convection between the lower heat spreader plate 9 and the disk drive 20 in the tray 21.

This specific example brings a number of advantages over the prior art arrangements. The space or footprint occupied by the cell 2 is minimised. The path length between the heat exchanger 13 and the heat spreader plates 8,9 is minimised, which reduces heat losses within the cell 2. It also allows the number of thermal interfaces or connections to be minimised, which increases efficiency. It also means that the thermal connection to the cell 2 for carrying heat into and out of the cell 2 may be the water hoses that supply the heat exchanger; such water hoses are typically flexible and thus this arrangement helps to vibrationally isolate the cell 2 from the exterior (such as the rack 1 in which the cell 2 is typically mounted in use). In contrast, in cases where the heat exchanger 13 is outside the cell 2, the thermal connection to the cell 2 would have to be made by a heat pipe, which is a rigid tube and which can therefore transmit vibrations into and out of the cell 2, which is undesirable. The mounting of the heat exchanger 13 within the cell 2 also minimises the empty space within the cell 2, which in turn minimises the moisture content within the cell 2. This is important given the low temperatures (below ambient, say 19° C., and even to 0° C. or lower) for the disk drive 20 intended to be achieved during operation. The fan 15 is vibrationally isolated from the disk drive 20, minimising the effect on the disk drive 20 of any vibration of the fan 15 during operation. Contact between the heat spreader plates 8,9 and the disk drive 20 is avoided, making the cell 2 more universally useful with disk drives of different type and shape. The use of the heat pumps 12, and in particular Peltier devices, allows the temperature range over which the disk drive 20 can be varied to be maximised and achieved in a quick and efficient manner.

Figure 10:
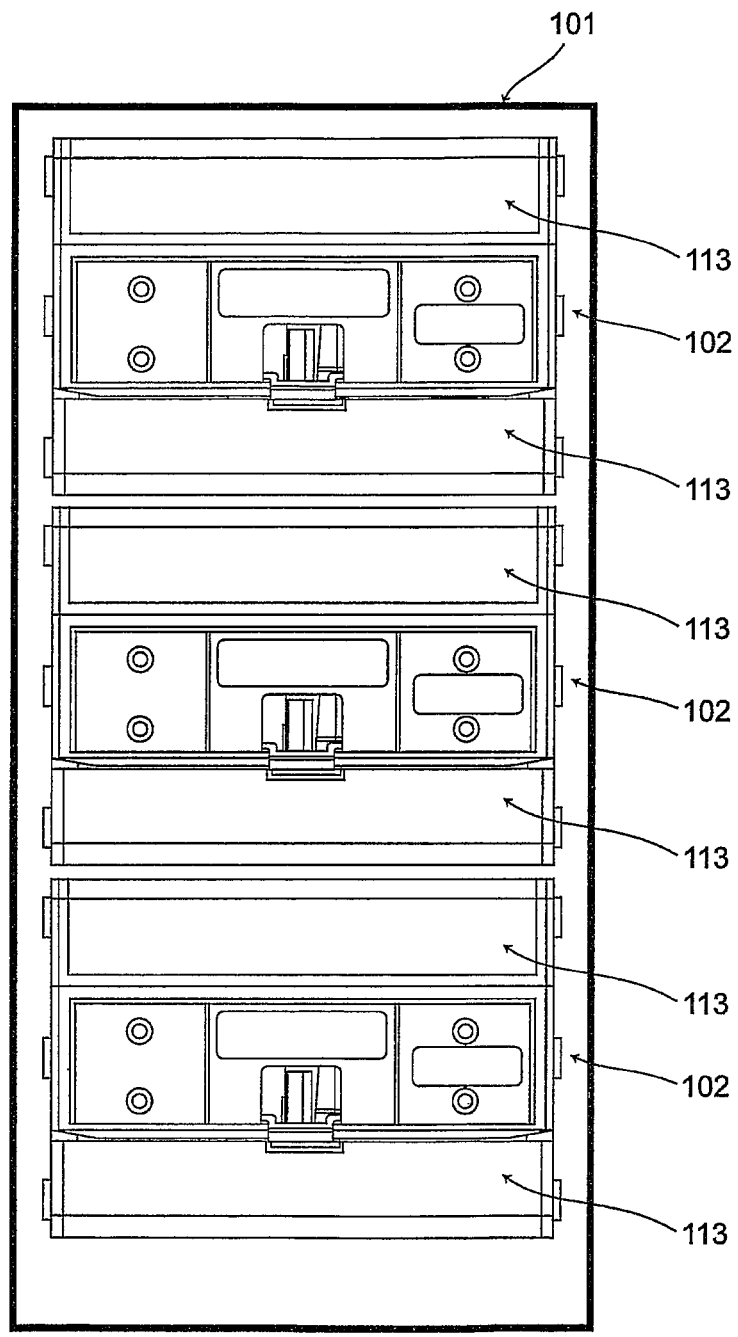
FIG. 10 is a front elevation of a rack having three of the apparatus of FIG. 7 stacked one above the other.

Reference is now made to FIGS. 7 to 10, which show a second example of apparatus 101 according to an embodiment of the present invention. The apparatus 101 includes a cell 102. Referring briefly to FIG. 10, the cells 102 are preferably arranged in groups of three, one stacked above the other. The volume 104 in the cell 102 is again sufficiently tall so as to leave an air space between the top and bottom of the disk drive 20 and the cell's upper and lower heat spreader plates 108,109 respectively. Each cell 102 has an axial fan 115, which again is preferably vibrationally isolated from the cell 102, which may be in a manner similar to that described above for the first example. Again, the main function of the fan 115 is to agitate air around the disk drive 20 within the volume 104 so as to encourage heat transfer between the disk drive 20 and the heat spreader plates 108,109. Each of the side walls 119 of the cell 102 has an internally facing rail 120 on which the carrier tray for the disk drive 20 can slide to mount the disk drive 20 in the volume 104.

The main difference between the first and second examples of the cells 2,102 is that in the second example, the cell 102 has a pair of heat exchangers 113, one being provided above and one being provided below the volume 104 in which the disk drive 20 is received. The heat exchangers 113 are thermally connected to the respective heat spreader plates 108, 109 by respective heat pumps 112, which again may be Peltier devices. The heat pumps 112 selectively pump heat into and out of the heat exchangers 113 from and to the disk drive 20. The heat exchanger 113 and heat pumps 112 and optionally the heat spreader plates 108,109 are preferably provided as a sealed sub-assembly so as to prevent or at least minimise moisture build-up around these components.

This particular arrangement, in which the heat exchangers 113 are in direct contact with the heat pumps 112 which themselves are in direct contact with the heat spreader plates 108,109, avoids the use of heat pipes, which is desirable given that the presence of heat pipes inevitably introduces some uncertainty in the temperature of the disk drive 20 that can be obtained owing to the temperature differential that is required between the ends of a heat pipe in order for the heat pipe to operate. The path length between the heat exchangers 113 and the heat spreader plates 108,109 is minimised, which reduces heat losses within the cell 102. It also allows the number of thermal interfaces or connections to be minimised, which increases efficiency. It also means that the thermal connection to the cell 102 for carrying heat into and out of the cell 102 may be the flexible water hoses that supply the heat exchangers 113, and thus this arrangement helps to vibrationally isolate the cell 102 from the exterior. The heat exchangers 113 again occupy space within the cell 102, minimising the volume of air within the cell 102, which is beneficial to minimise the moisture content within the cell 102. Moreover, and referring to FIG. 10, when plural such cells 102 are mounted one above the other in a tester rack, the respective upper and lower heat exchangers 113 of adjacent cells 102 are adjacent each other. Now, in general, all of the heat exchangers 113 will be at the same temperature (which may be for example 15° C.), irrespective of the actual temperatures of the disk drives 20 mounted in the respective cells 102. Again, it is recalled that any disk drive 20 in any cell 102 may be at any temperature over the testing range (which again may be from below 0° C. up to 70° C. or more). The heat exchangers 113 therefore effectively thermally isolate the disk drives 20 from each other and adjacent parts of the cells 102 are at substantially the same temperature. Thus, there is in substance no thermal cross talk between adjacent cells 102.

Embodiments of the present invention have been described with particular reference to the examples illustrated. However, it will be appreciated that variations and modifications may be made to the examples described within the scope of the present invention. For example, whilst an axial fan is preferred for agitating the air, other air-agitating devices may be used, including for example radial or centrifugal fans, an oscillatory air movement generator (e.g. a voice-coil motor connected to a diaphragm, or a piezo-electric element or bellows), etc. By way of another example, in embodiments, the heat exchanger(s) may be thermally directly connected to the heat spreader plate(s), or connected via one or more heat pipes, or connected via one or more heat pumps, or connected via one or more heat pipes and one or more heat pumps. Where provided, the heat pump(s) may be connected at one or other end of the heat pipe(s) (i.e. adjacent the heat exchanger or the heat spreader plate) or heat pumps may be provided at both ends of the heat pipe(s). Each cell may hold only one disk drive or may hold plural disk drives. Depending on the embodiment, there may be one or plural heat exchangers, one or plural heat pipes to the or each heat exchanger, one or plural heat pumps, etc. The heat conductive wall may be a part of the heat exchanger. Alternatively or additionally, the heat conductive wall may be a part of the heat pump when provided. Where plural heat pipes are connected to a single part, such as a heat exchanger, a heat pump, or heat spreader plate, the ends of the heat pipes may be fixed to or embedded in a mounting plate which is attached to the single part. Indeed, the mounting plate may be one of the heat spreader plates.

The invention claimed is:

1. Apparatus for controlling the temperature of a disk drive and being for use during manufacture of the said disk drive, the apparatus comprising:
a shelf configured to receive a cell;
a cell mounted on the shelf by one or more isolators, the cell having a mounting arrangement to which a disk drive can be mounted and having walls defining a volume in which the disk drive is received when mounted to the mounting arrangement during manufacture of the disk drive, the cell further comprising a void;
at least one wall of the cell adjacent said volume being heat conductive and being arranged such that a disk drive when received in the volume does not touch said at least one wall; and,
an air-agitating device provided on the shelf, the air agitating device being constructed and arranged to agitate air between said at least one wall and a disk drive when received in the volume to encourage heat transfer between said at least one wall and a disk drive when inserted into the volume;
wherein the air-agitating device is arranged in the void but not connected to the cell so as to be vibrationally isolated from said disk drive when mounted in the cell.

2. Apparatus according to claim 1, comprising a heat exchanger mounted within the cell.

3. Apparatus according to claim 2, wherein the heat exchanger is directly thermally connected to said heat conductive wall.

4. Apparatus according to claim 2, wherein the heat exchanger is thermally connected to said heat conductive wall by a heat pump that is operable to pump heat between the heat exchanger and the heat conductive wall.

5. Apparatus according to claim 2, wherein the heat exchanger is thermally connected to said heat conductive wall by a heat pipe.

6. Apparatus according to claim 5, wherein the heat exchanger is thermally connected to the heat pipe by a heat pump that is operable to pump heat between the heat exchanger and the heat pipe.

7. Apparatus according to claim 4, wherein the heat pump is a Peltier device.

8. Apparatus according to claim 1, wherein the air-agitating device is a fan.

9. A method for use in manufacture of a disk drive, the method including controlling the temperature of a disk drive during manufacture of the disk drive, the method comprising:
in an apparatus having a shelf, mounting a disk drive to a mounting arrangement of a cell having walls that define a volume in which the disk drive is received when mounted to the mounting arrangement during manufacture of the disk drive, at least one wall of the cell adjacent said volume being heat conductive and being arranged such that the disk drive when received in the volume does not touch said at least one wall;
mounting the cell on the shelf using one or more isolators; and,
operating an air-agitating device provided on the shelf to agitate air between said at least one wall and a disk drive when received in the volume to encourage heat transfer between said at least one wall and a disk drive when inserted into the volume;
the air-agitating device being arranged within a void in the cell such that the air agitating device is not connected to the cell and is vibrationally isolated from the disk drive.

10. A method according to claim 9, comprising operating a heat exchanger mounted within the cell.

11. A method according to claim 10, wherein the heat exchanger is directly thermally connected to said heat conductive wall.

12. A method according to claim 10, wherein the heat exchanger is thermally connected to said heat conductive wall by a heat pump, and comprising operating the heat pump to pump heat between the heat exchanger and the heat conductive wall.

13. A method according to claim 10, wherein the heat exchanger is thermally connected to said heat conductive wall by a heat pipe.

14. A method according to claim 13, wherein the heat exchanger is thermally connected to the heat pipe by a heat pump, and comprising operating the heat pump to pump heat between the heat exchanger and the heat pipe.

15. A method according to claim 12, wherein the heat pump is a Peltier device.

16. A method according to claim 9, wherein the air-agitating device is a fan.

17. Apparatus for controlling the temperature of a disk drive independently of other disk drives and being for use during manufacture of the said disk drive, the apparatus comprising:
a shelf configured to receive a cell;
a cell provided on the shelf and mounted thereto by one or more isolators, and having a mounting arrangement to which a disk drive can be mounted and having walls defining a volume in which the disk drive is received when mounted to the mounting arrangement during manufacture of the disk drive;
an upper wall of the cell adjacent said volume and a lower wall of the cell adjacent said volume both being heat conductive and being arranged such that a disk drive when received in the volume does not touch said upper and lower walls; and,
an upper heat exchanger located above and in thermal contact with said upper wall and a lower heat exchanger located below and in thermal contact with said lower wall so as to independently monitor the temperature of the disk drive in the cell;
an air-agitating device provided on the shelf and arranged to agitate air between said upper and lower walls and a disk drive when received in the volume to encourage heat transfer between said upper and lower walls and the disk drive when inserted into the volume, wherein the air-agitating device is mounted on the shelf so as to be positioned within a void in the cell so as to be vibrationally isolated from said disk drive when mounted on the shelf.

18. Apparatus according to claim 17, comprising a first heat pump between the upper heat exchanger and said upper wall that is operable to pump heat between the upper heat exchanger and said upper wall, and a second heat pump between the lower heat exchanger and said lower wall that is operable to pump heat between the lower heat exchanger and said lower wall.

19. Apparatus according to claim 18, wherein the heat pumps are Peltier devices.

20. Apparatus according to claim 17, wherein the air-agitating device is a fan.

21. A method for use in manufacture of a disk drive, the method including controlling the temperature of a disk drive independently of other disk drives during manufacture of the disk drive, the method comprising:

mounting a disk drive to a mounting arrangement of a cell having walls defining a volume in which the disk drive is received when mounted to the mounting arrangement during manufacture of the disk drive, an upper wall of the cell adjacent said volume and a lower wall of the cell adjacent said volume both being heat conductive and being arranged such that the disk drive when received in the volume does not touch said upper and lower walls;

providing the cell on a shelf within a rack-like apparatus, the cell being mounted on the shelf by one or more isolators;

operating an upper heat exchanger located above and in thermal contact with said upper wall and a lower heat exchanger located below and in thermal contact with said lower wall to control the temperature of the disk drive so as to independently monitor the temperature of the disk drive in the cell; and operating an air-agitating device to agitate air between said upper and lower walls and a disk drive when received in the volume to encourage heat transfer between said upper and lower walls and the disk drive when inserted into the volume, wherein the air-agitating device is arranged within a void in the cell but not connected to the cell such that the air-agitating device is vibrationally isolated from the disk drive.

22. A method according to claim 21, comprising operating a first heat pump between the upper heat exchanger and said upper wall to pump heat between the upper heat exchanger and said upper wall, and operating a second heat pump between the lower heat exchanger and said lower wall to pump heat between the lower heat exchanger and said lower wall.

23. A method according to claim 22, wherein the heat pumps are Peltier devices.

24. A method according to claim 21, wherein the air-agitating device is a fan.

25. Apparatus according to claim 17, comprising an opening in the cell through which a disk drive can be inserted or removed during manufacture.

* * * * *